Patented Feb. 9, 1937

2,070,145

UNITED STATES PATENT OFFICE 2,070,145

ORGANIC ARSENIC COMPOUNDS

Karl Streitwolf, Frankfort-on-the-Main, Alfred Fehrle, Bad Soden in Taunus, and Hubert Oesterlin, Frankfort-on-the-Main, Germany, assignors to Winthrop Chemical Company, Inc., New York, N. Y., a corporation of New York No Drawing. Application July 22, 1930, Serial No. 469,922. In Germany August 27, 1929

4 Claims. (Cl. 260—15)

The present invention relates to organic arsenic compounds, more particularly to compounds of the following formula Ar.As=As.Ar wherein Ar represents an aromatic radical, one of them substituted by the group $CH_2OH—CO—NH—$ and wherein both aromatic radicals, however, may be further substituted.

We have found that these compounds which have been obtained according to the process of our co-pending U. S. application Ser. No. 384,804, filed August 9, 1929, by reduction of arsonic acids, can also be obtained by condensing one component in the form of its arsine with the other component in the form of the arsine oxide or the corresponding dichlorarsine or vice versa.

The arsenobenzenes obtained according to this process possess a high therapeutic value.

The following examples serve to illustrate the invention, but they are not intended to limit it thereto.

(1) 24.1 grams of 4-glycolylaminobenzene-arsine oxide are dissolved in 500 cc. of 10n alcoholic hydrochloric acid and a solution of 18.5 grams of 3-amino-4-hydroxyphenylarsine in 250 cc. of alcohol is added thereto while stirring. After a short time, the arsenobenzene of the following formula:

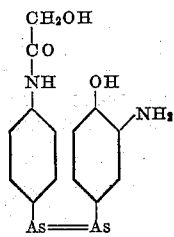

formed begins to separate. After 1 hour it is filtered by suction and washed with water, alcohol and ether. The yield amounts to 35 grams.

(2) 55 grams of 4-glycolylaminobenzene-1-arsonic acid are dissolved in 500 cc. of methyl alcohol. After addition of 300 grams of zinc dust, 1 liter of concentrated hydrochloric acid is added to the mixture drop by drop while stirring and introducing nitrogen, a saponification of the acyl group being avoided by suitably cooling to 20° C.–25° C. The whole is stirred until nearly all the zinc is dissolved, filtered by suction and the filtrate is extracted with ether. The ethereal solution is shaken with 2-normal caustic soda solution, the alkaline-aqueous solution is treated with hydrochloric acid until it shows an acid reaction to Congo paper and filtered. To the filtrate is added a solution of 34 grams of the hydrochloride of 3-amino-4-hydroxybenzene-arsine-oxide (cf. "Berichte der deutschen Chemischen Gesellschaft", volume 45, 1912, page 760) in 200 cc. of $n/10$ hydrochloric acid, and 2 normal sodium acetate solution is introduced while stirring until the mixture shows a neutral reaction to Congo paper. Thereby the arsenobenzene is caused to separate; it is filtered by suction and washed.

The product is a yellow powder which is easily soluble in dilute caustic soda solution. It has a small toxicity and a high curative power. Yield: 44 grams.

(3) 55 grams of 4-glycolylaminobenzene-1-arsonic acid are, as described in the foregoing example, reduced to the 4-glycolylaminobenzene-arsine; the aqueous hydrochloric acid solution obtained of the arsine is introduced while stirring into a solution of 58 grams of the hydrochloride of 4-hydroxy-3-aminobenzene-arsine-dichloride-hydrochloride in 600 cc. of methyl alcohol and 900 cc. of ½n hydrochloric acid, allowed to stand over night and the arsenobenzene is separated by neutralizing with sodium acetate solution. Yield: 46 grams.

(4) By using in Example 2 instead of 3-amino-4-hydroxy-benzene-arsine-oxide - hydrochloride, 30 grams of 4-aminobenzene-1-arsine oxide, 53 grams of 4-amino-4'-glycolylamino-arseno-benzene of the following formula:

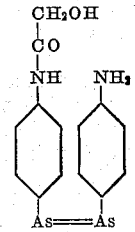

are obtained in the form of a light brown powder.

(5) 25.7 grams of 3-glycolylamino-4-hydroxybenzene-arsine-oxide (cf. our co-pending U. S. application Serial No. 384,804, filed August 9, 1929, are dissolved in 500 cc. of $n/10$ alcoholic hydrochloric acid and a solution of 21.1 grams of 4-acetylaminobenzene-arsine in 250 cc. of alcohol is added thereto while stirring. The arsenobenzene formed quickly separates and after some time it is filtered by suction and washed. 3-glycolylamino-4-hydroxy-4'-acetylaminoarseno-benzene of the following formula:

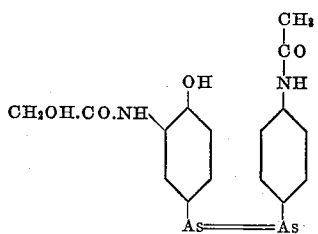

is a light powder easily soluble in dilute caustic soda solution. Yield: 42 grams.

(6) 58 grams of 2-methyl-4-glycolylamino-benzene-1-arsonic acid are reduced according to Example 2. The hydrochloric acid solution of the arsine is combined with a solution of 34 grams of 3-amino-4-hydroxybenzene-arsine-oxide-hydrochloride in 200 cc. of $n/10$ hydrochloric acid and, by adding while stirring 2 normal sodium acetate solution, 47 grams of 2-methyl-4-glycolylamino-3'-amino-4'-hydroxyarsenobenzene of the following formula:

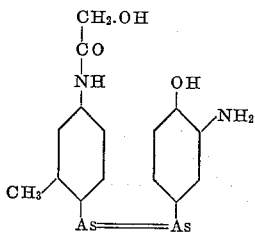

are separated. A light yellow powder is obtained which is easily soluble in dilute caustic soda solution.

(7) By substituting in the foregoing example 34 grams of 3-acetylamino-4-hydroxybenzene-arsine-oxide for 3-amino-4-hydroxybenzene-arsine-oxide-hydrochloride, 58 grams of 2-methyl-4-glycolylamino-3'-acetylamino-4'-hydroxyarsenobenzene of the following formula:

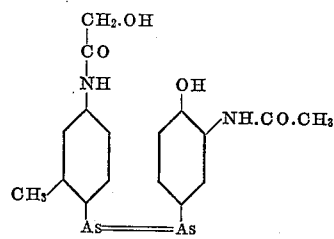

are likewise obtained in the form of a feebly yellow powder easily soluble in caustic soda solution.

(8) 45 grams of 1(2,3-dimethyl-4-aminopyrazolyl) benzene-4-arsine-oxide are dissolved in 300 cc. of $n/10$ hydrochloric acid and the solution is introduced while stirring into the aqueous hydrochloric acid solution of para-glycolylamino-benzene-arsine obtained according to Example 2, the whole is allowed to stand for some time and the arsenobenzene formed is separated by means of 2 normal sodium acetate solution. Yield: 68 grams.

The compound obtained corresponds to the following formula:

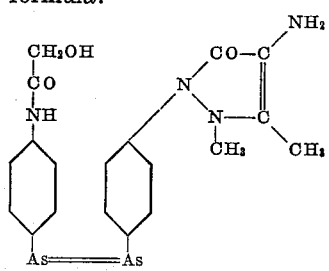

We claim:
1. The compounds of the following general formula:

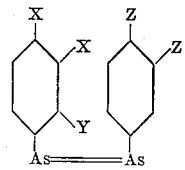

wherein one X stands for CH₂OH—CO—NH—, the other X for a member of the group consisting of hydrogen and hydroxy, Y stands for a member of the group consisting of hydrogen and methyl, Z stands for a member of the group consisting of hydrogen, hydroxy, amino and acetylamino, said compounds containing a nuclear hydroxy group and being suitable for therapeutical purposes.

2. The compounds of the following general formula:

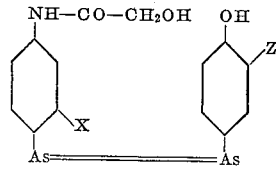

wherein X stands for a member of the group consisting of hydrogen and methyl and Z stands for a member of the group consisting of hydrogen, amino and acetylamino, being suitable for therapeutical purposes.

3. The compound of the following formula:

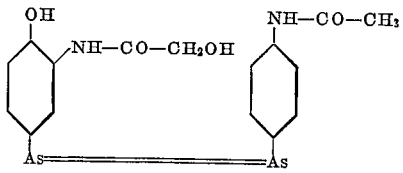

being suitable for therapeutical purposes.

4. The compound of the following formula:

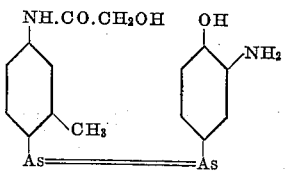

being suitable for therapeutical purposes.

KARL STREITWOLF.
ALFRED FEHRLE.
HUBERT OESTERLIN.